United States Patent [19]
Nigsch et al.

[11] Patent Number: 5,250,091
[45] Date of Patent: Oct. 5, 1993

[54] APPARATUS FOR SEPARATING A GAS-WATER VAPOR MIXTURE

[75] Inventors: Harald Nigsch, Weingarten; Friedhelm Wiederspohn, Mettmann, both of Fed. Rep. of Germany

[73] Assignee: Dornier GmbH, Fed. Rep. of Germany

[21] Appl. No.: 846,340

[22] Filed: Mar. 5, 1992

[30] Foreign Application Priority Data

Mar. 5, 1991 [DE] Fed. Rep. of Germany ....... 4106895

[51] Int. Cl.$^5$ ...................... B01D 19/00; B01D 71/02
[52] U.S. Cl. ........................................ 55/269; 55/498
[58] Field of Search ............. 55/16, 158, 159, 267-269

[56] References Cited

U.S. PATENT DOCUMENTS

| | | | |
|---|---|---|---|
| 2,009,352 | 7/1935 | Adams | 55/269 |
| 2,223,586 | 12/1940 | Thomas | 55/158 |
| 2,584,785 | 2/1952 | Bowman et al. | 55/16 |
| 2,589,297 | 3/1952 | Schwertz | 55/16 |
| 3,511,031 | 5/1970 | Ketteringham et al. | 55/158 |
| 3,661,721 | 5/1972 | Rodgers | 55/158 X |
| 4,268,279 | 5/1981 | Shindo et al. | 55/158 X |
| 4,583,996 | 4/1986 | Sakata et al. | 55/16 |
| 4,671,809 | 6/1987 | Taketomo et al. | 55/158 |
| 4,873,835 | 10/1989 | Rojey et al. | 55/269 X |

*Primary Examiner*—Robert Spitzer
*Attorney, Agent, or Firm*—Evenson, McKeown, Edwards & Lenahan

[57] ABSTRACT

Apparatus for separating a gas-water vapor mixture having a cooling liquid space for circulation of a cooling liquid, at least one duct arranged in the cooling liquid space and a separation water space arranged adjacent the duct. The walls of the duct are made of a permeable membrane so that water condensed from the gas as it flows through the duct can permeate into the separation water space.

8 Claims, 4 Drawing Sheets

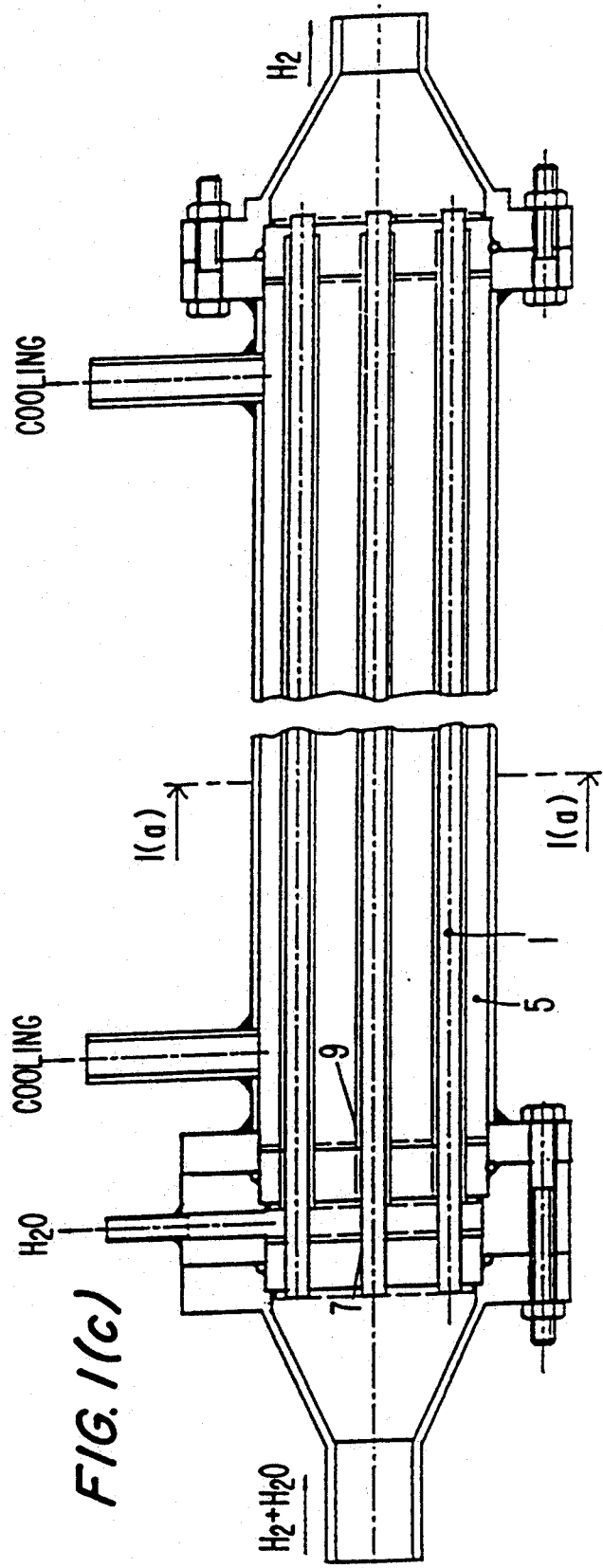
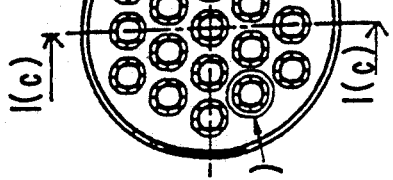
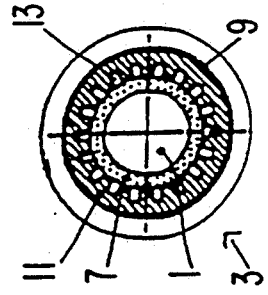
FIG. 1(a)
FIG. 1(b)
FIG. 1(c)

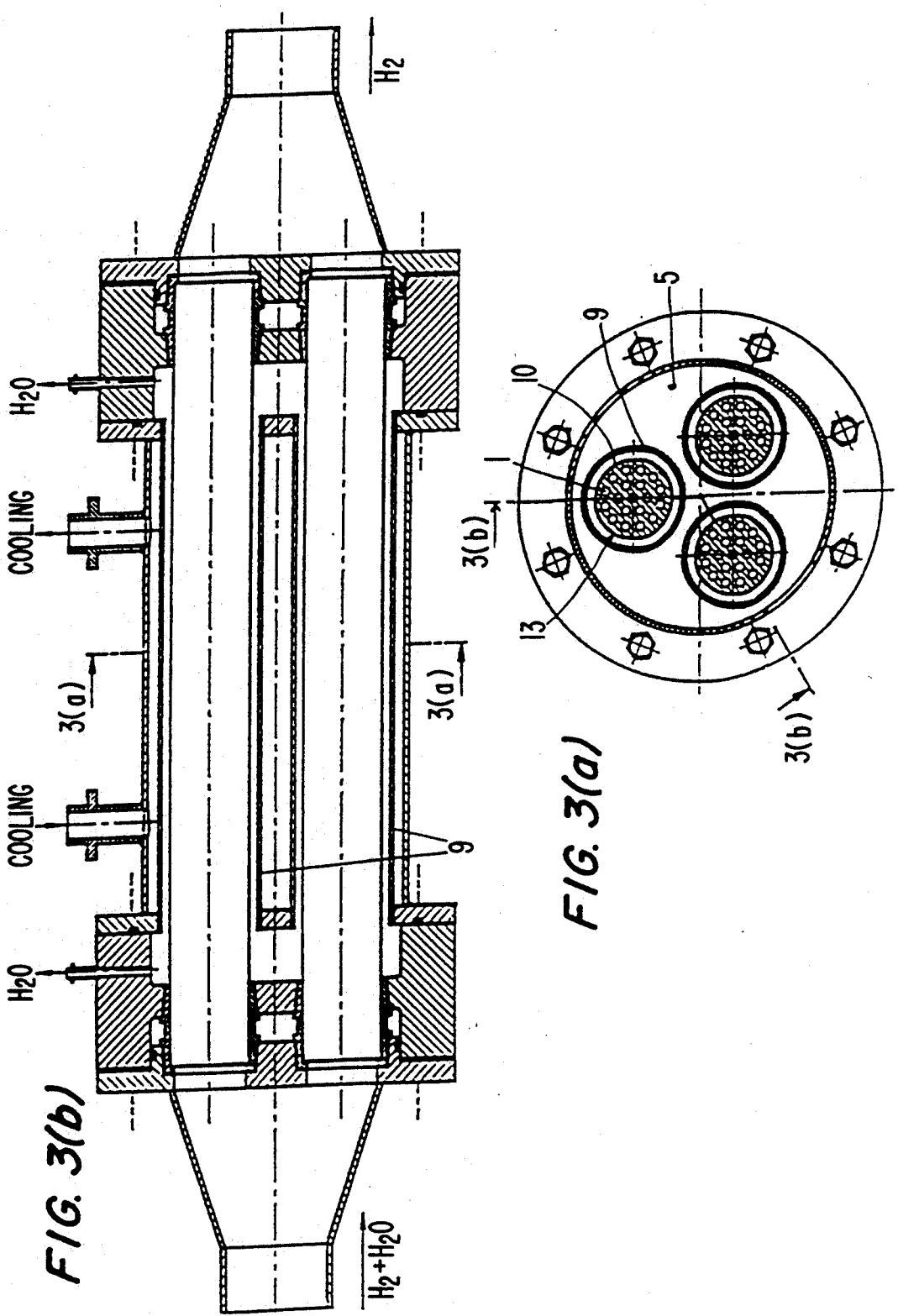

APPARATUS FOR SEPARATING A GAS-WATER VAPOR MIXTURE

BACKGROUND AND SUMMARY OF THE INVENTION

This invention relates to a separator which operates effectively in weightless, or zero-gravity, conditions.

In immobile fuel cells, water formed during the combustion of oxygen and hydrogen is discharged in the form of water vapor by way of a separate hydrogen circulation. In this case, the water vapor charge of the hydrogen, similar to humidity in ambient air, is in the range of 50%-90% relative humidity. So that the circulating hydrogen is able to absorb new water vapor continuously, a separator must be installed behind the cells which reduces the absolute water vapor proportion corresponding to the charge in the hydrogen.

Since fuel cells so far have been used mainly in space operations (for example, the U.S. Apollo program, the U.S. Space Shuttle, and the European Hermes Space Plan Program), special requirements are imposed on such a gas-steam separator. These include:
- secure functioning in weightless conditions and during accelerations of approximately 3 to 7 g;
- an energy requirement that is as low as possible; and
- a very low pressure loss component.

Heretofore, two basic physical processes have been known for the separation of a gas-water vapor mixture:
1. Mechanical separation based on the centrifugal force principle, such as is described in the German patent document DE-PS 39 32 578; and
2. Membrane Separation described in "Jahrbuch 1989 I der Deutschen Gesellschaft für Luft- und Raumfahrt (DGLR)" ["Yearbook 1989 I Of the German Association for Air and Space Travel (DGLR)"], Pages 605 to 608.

Since the latter approach is used in the process according to the invention, it will be explained in detail in the following.

In terrestrial applications, a gas - water vapor mixture can be separated in a simple manner. For example, by means of a condensation heat exchanger, the humidity-laden gas can be cooled below the dew point, so that the condensed water vapor runs off on cooling plates to the lowest point of the condenser, where the water outlet is situated. Under conditions of microgravitation, however, this principle would function only partially. That is, while the diffusion of the water vapor onto a wall cooled below the dew point also takes place fully under conditions of weightlessness, the separation of the water from the cooled wall is not ensured without additional forces, thus resulting in an undefined state in the condenser. A forced flow of the condensate film could be achieved by means of a "Slurper" (removal of the film by means of vacuum suction); however, this would result only in a preseparation, whereby an additional component would be required for the afterseparation of the gas and the water.

The simplest method of separating the condensate film is by means of suction directly through the cooled wall into a separate separation water space. For this purpose, the condenser walls must be constructed as membranes which selectively let only water pass through.

Hydrophilic porous structures which are resistant to pressure and temperature are suitable for use as membranes. The gradient for the water discharge is a pressure difference from the gas space to the separation water space. This pressure difference must be sufficiently large to ensure that all condensed water can permeate through the membrane, even during the acceleration phases (occurring hydrostatic counter pressure). For this reason, the pressure difference must be correspondingly higher for the normal operation.

The selectivity of the membrane is achieved by capillary forces on the membrane surface which, up to a certain transmembrane pressure difference (bubble point), cause the capillaries to remain filled with water, and therefore prevent a gas breakthrough. The permissible transmembrane pressure difference is a function of the theoretic capillary diameter, the shape of the pores and the wetting angle between the membrane and the water. In the above mentioned patent document, a device is provided for carrying out the process which comprises a tube-shaped membrane through which the gas mixture flows.

It is an object of the invention to provide a device for carrying out the described membrane separation process which has a construction that is as compact as possible and is reliable and relatively trouble free.

This object is achieved by means of the separator according to the invention wherein ducts, inside which the mixture of water vapor and inert gas flows, and the interior surface of which is formed by a cooled hydrophilic fine-pored membrane, extend inside one or several separation water spaces. These separation water spaces, in turn, extend inside a coolant space so that, by means of thermal conduction, the cooling of the membrane is achieved by way of the cooling of the separation water spaces. The separation water and the cooling liquid are therefore separate from one another.

In one embodiment, a single duct extends in a separation water space. In a further embodiment, several ducts are enclosed by a separation water space. In the latter, the ducts may also extend inside a large-pored supporting body, preferably made of ceramic, which is situated inside the separation water space.

Preferred applications of the invention are:
- Separation of hydrogen and water vapor or oxygen and water vapor for immobile fuel cells in spaceships and submarines;
- separation of air and water vapor for the treatment of breathing air in spaceships, space suits and submarines.

The following membrane materials may be used:
porous sintered metals
porous ceramics
porous carbon.

The inherent stability of the membrane is achieved by means of a thick large-pored supporting layer to which the thin fine-pored membrane layer is applied. The support and the membrane may be made of the same material and form a sintered structure, referred to as a monolithic composite, or combinations of different materials may be used for the support layer and the membrane layer. The following table indicates the materials for six self-supporting membrane structures. All have a high resistance to temperature, pressure and chemicals and therefore permit a long life of the separator.

| Supporting Material Composite of | Active Layer (Membrane) Composite of |
|---|---|
| $\alpha$ - $Al_2O_3$ | $\alpha$ - $Al_2O_3$ |
| $\gamma$ - $Al_2O_3$ | $\gamma$ - $Al_2O_3$ |

-continued

| Supporting Material Composite of | Active Layer (Membrane) Composite of |
| --- | --- |
|  | $ZrO_2$ |
| $\alpha$ - $Al_2O_3$ | $\alpha$ - $Al_2O_3$ |
| SiC | $\alpha$ - $Al_2O_3$ |
| C (carbon fibers) | Composite on a carbon base |
| C (amorphous carbon) | Composite on a zirconium oxide base |
| porous stainless steel | $ZrO_2$ (fired, gelled) |

Other objects, advantages and novel features of the present invention will become apparent from the following detailed description of the invention when considered in conjunction with the accompanying drawings.

BRIEF DESCRIPTION OF THE DRAWINGS

FIG. 1.*a*) is a cross sectional view of a separator according to the invention having the structure of an array of pipes;

FIG. 1.*b*) is an enlarged cross section of one pipe according to the invention;

FIG. 1.*c*) is a longitudinal cross section of the separator of FIG. 1.*a*);

FIGS. 3.*a*) and *b*) show an alterative embodiment of the invention having a multiduct structure;

DETAILED DESCRIPTION OF THE DRAWINGS

Figures 2A, 2B:
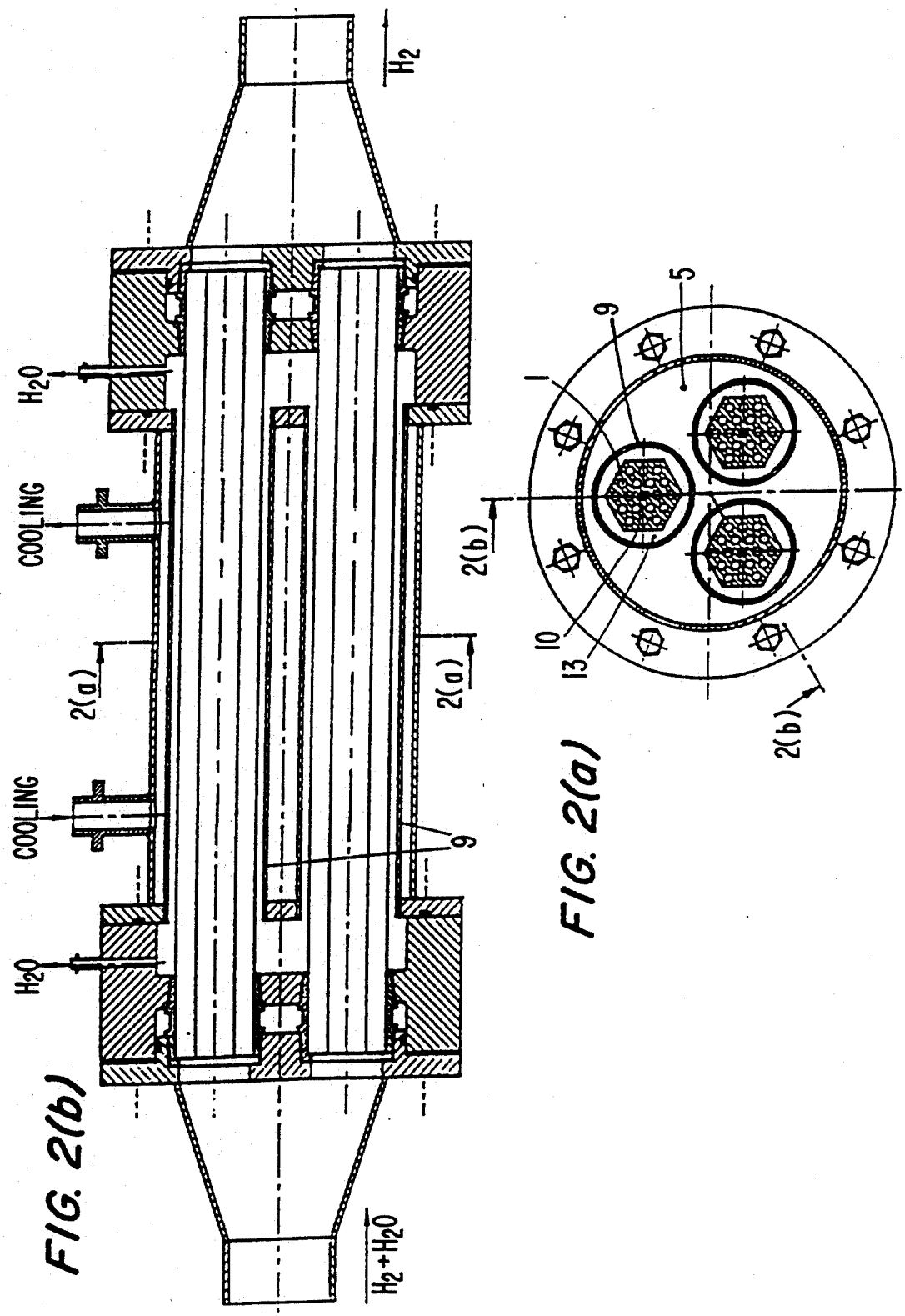
FIGS. 2.*a*) and *b*) show an embodiment of the invention having a multiduct structure.

FIG. 1 depicts a separator according to the invention with the structure of an array of pipes. In each pipe, a single duct 1, through which a mixture flows, extends inside a separation water space 13. In the case of separators with a multiduct structure as shown in FIGS. 2 through 4, several ducts 1 extend inside a separation water space 13. In the latter embodiments, a large-pored supporting body 10 is situated inside the separation water space 13 which is preferably made of a ceramic material, the ducts 1 extending inside this supporting body 10.

In each case, the finely porous membrane 7 is situated on the interior surface of the ducts 1. Separation of the water, from the gas takes place from the inside to the outside into the separation water space 13, which is separate from the cooling liquid, such as $H_2O$. On both separator ends, this separation water space 13 has connections for the discharge of the separation water. Each separator thus has at least five connections: a gas mixture inlet 14; a gas outlet 15; a cooling liquid inlet 16; a cooling liquid outlet 17; and at least one separation water outlet 18. The embodiments illustrated in FIGS. 2 through 4 have in addition a second separation water outlet 19.

FIG. 1.*a* is a cross-sectional view of a separator, according to the invention, having the structure of an array of pipes. Several pipes 3 extend in parallel to one another inside the cooling liquid space 5. (See also FIG. 1.*c*.) The construction of such a pipe 3 is shown in FIG. 1*b* in an enlarged view. It comprises, in a concentric relationship to one another, a jacket pipe 9 on the outside, (which provides a separation between the cooling liquid), and the finely porous membrane 7 as the interior surface. The porous membrane forms duct 1 inside of which the mixture of hydrogen and water vapor flows. The space between the jacket pipe 9 and the membrane 7 contains the separation water space 13 and a cooling space 11. The cooling space 11 is used for the improvement of the heat contact between the cooling liquid and the membrane 7.

FIG. 1*c* is a cross-sectional view along Line A—A of FIG. 1.*a*. The mixture of hydrogen gas and water vapor flows from the left, through inlet 14 into the separator, and through the ducts 1 formed by the membrane 7. During passage of the gas/water vapor mixture through ducts 1, the water vapor is condensed and permeates through the membrane 7 into the separation water space 13. The dried mixture, which is reduced with respect to its water vapor, (or in the ideal case, the pure hydrogen gas) leaves the separator on the opposite side 15. The separation water leaves the separator in a separate outlet 18.

FIG. 2*a* is a cross-sectional view of a separator with a multiduct structure. Inside the cooling liquid space 5, it comprises three separation water spaces 13 which are separated from the cooling water space 5 by means of the jacket pipes 9. In each separation water space 13, one large-pored ceramic supporting body 10 is situated, which has a cross-section in the shape of a regular hexagon. The ducts 1, the interior surfaces of which are formed by the fine-pored membrane, extend inside this supporting body 10. FIG. 2*b* is a cross-sectional view along Line A—A.

FIG. 3 is a view of a separator which corresponds essentially to that shown in FIG. 2, except that the cross-section of the large-pored ceramic supporting body 10 is circular.

Figure 4A:
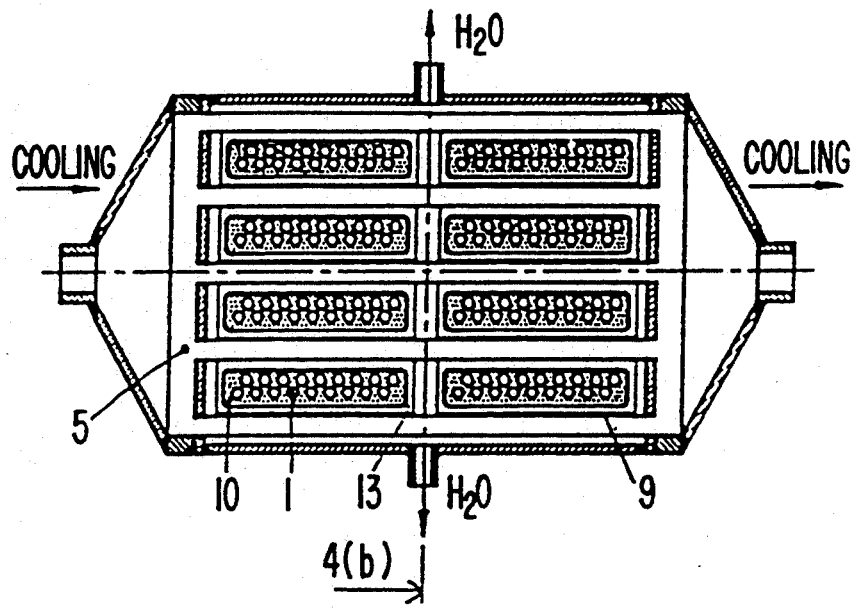
FIGS. 4.*a*) and *b*) show a further embodiment with a multiduct structure.
Figure 4B:
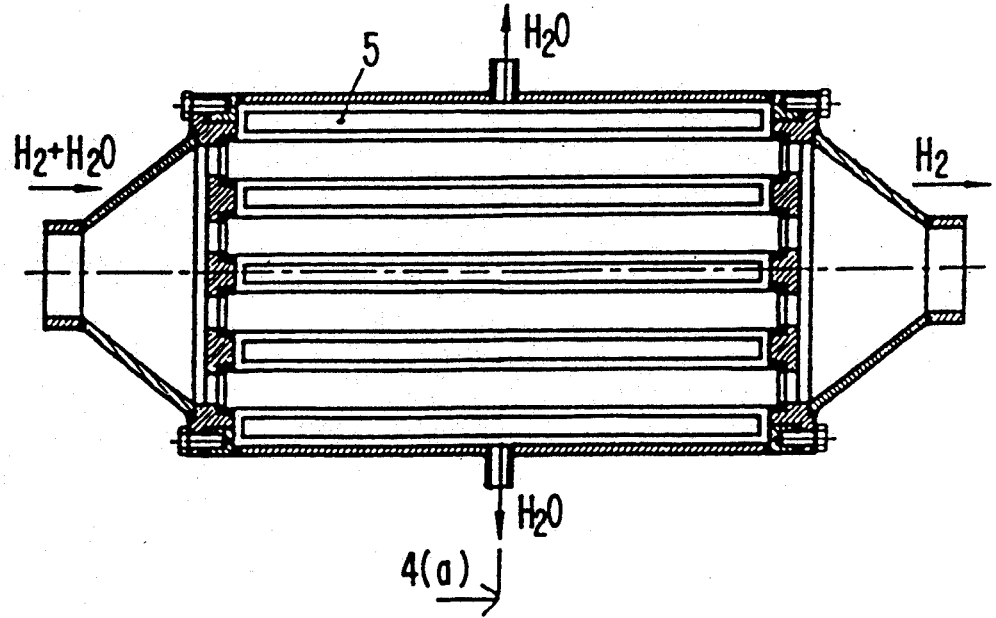

FIG. 4*a* is a view of another separator with a multiduct geometry. In this case, the large-pored ceramic supporting bodies 10 have the shape of a plate. Each of the ceramic supporting bodies 10 is situated inside a single separation water space 13. These, in turn, are separate from the cooling liquid space 5. FIG. 4*b* is a cross-sectional view along Line B—B.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for separation of a mixture of water vapor and a gas, which operates effectively in a weightless environment, comprising:

a cooling liquid space for circulation of a cooling liquid therein;

at least one duct through which said mixture can flow, said duct being arranged within said cooling liquid space and having an interior surface formed by a hydrophilic fine - pored membrane;

an inlet, connected to said duct, for providing the mixture of water vapor and gas to said duct;

at least one separation water space arranged in said cooling liquid space adjacent to said at least one duct, whereby water vapor condensed in said at least one duct can permeate through said membrane into said separation water space; and a separation water outlet, connected to said separation water space, for receiving water from said separation water space.

2. Apparatus according to claim 1, wherein said at least one duct extends in said separation water space.

3. Apparatus according to claim 1, wherein a plurality of ducts extends inside said separation water space.

4. Apparatus according to claim 3, wherein said ducts extend inside a large-pored supporting body situated in the separation water space.

5. Apparatus according to claim 1, wherein said gas is an inert gas.

6. Apparatus according to claim 1, wherein said separation water space comprises an elongated tube arranged in contact with said duct, and has at least one outlet for discharge of condensed water.

7. Apparatus for separation of a mixture of water vapor and a gas, which operates effectively in a weightless environment, comprising:

at least one duct through which said mixture can flow, said duct having a bounding surface comprising a hydrophilic fine pored membrane;

an inlet, connected to said duct, for providing the mixture of water vapor and gas to said duct;

at least one separation water space arranged adjacent said duct and separated therefrom by said bounding surface;

a separation water outlet, connected to said separation water space, for receiving water from said separation water space; and means for cooling said bounding surface whereby water is condensed in said duct and permeates into said separation water space through said bounding surface.

8. Apparatus according to claim 1, wherein said separation water space comprises an elongated tube arranged in contact with said duct, and has at least one outlet for discharge of condensed water.

* * * * *